Oct. 11, 1938.  G. SLAYTER  2,133,235
METHOD AND APPARATUS FOR MAKING GLASS WOOL
Original Filed Nov. 11, 1933  2 Sheets-Sheet 1
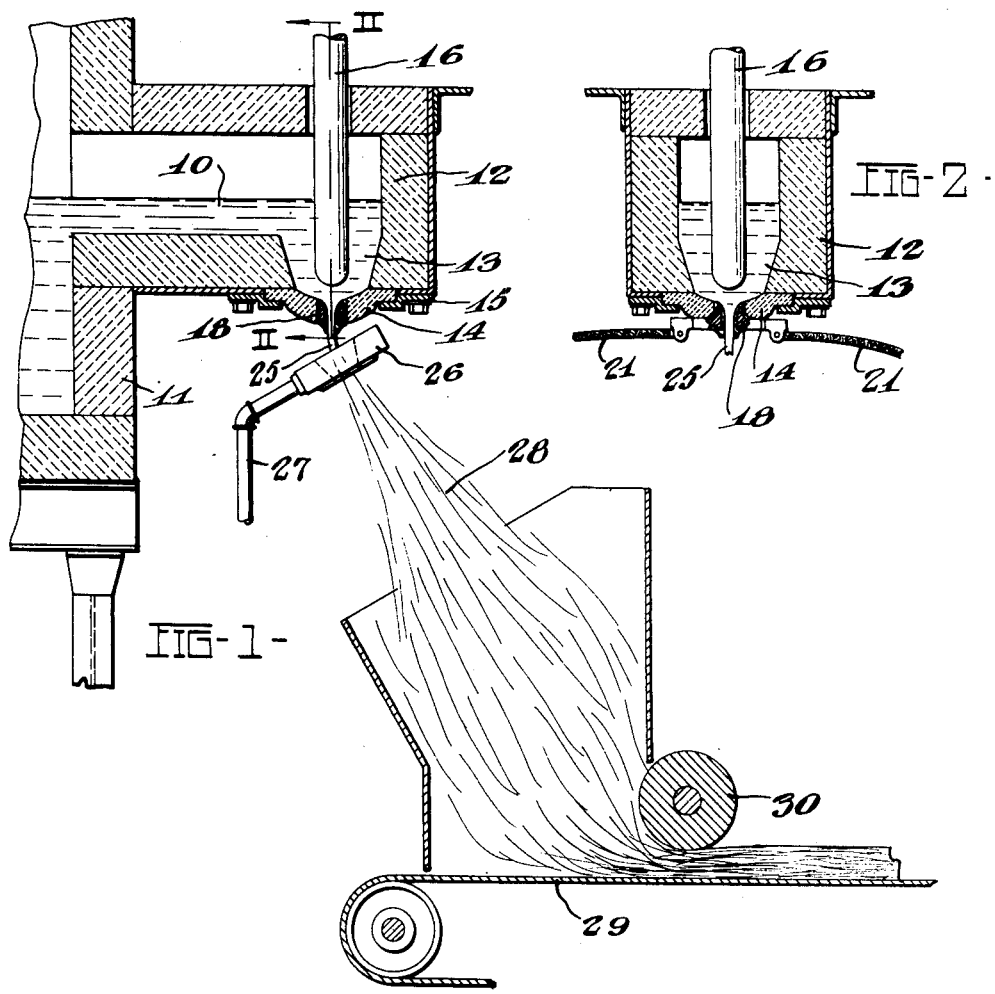
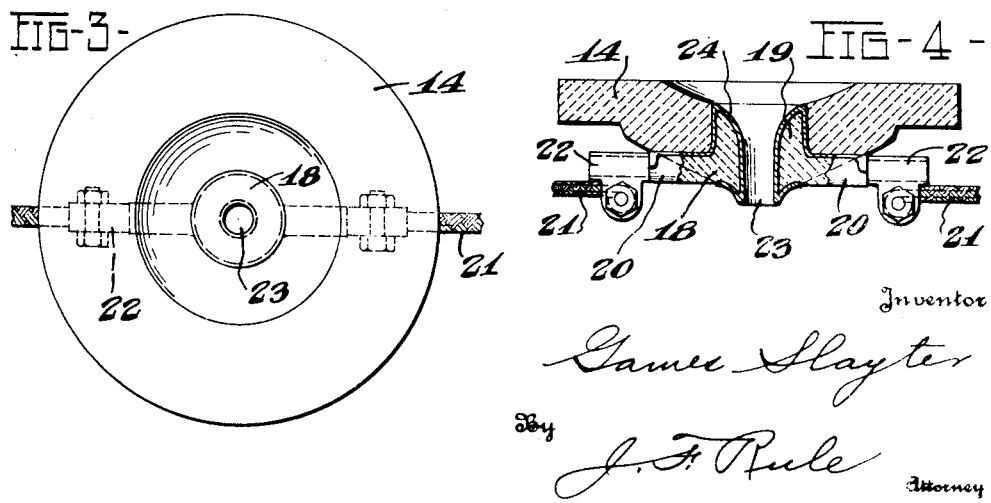

Oct. 11, 1938. G. SLAYTER 2,133,235
METHOD AND APPARATUS FOR MAKING GLASS WOOL
Original Filed Nov. 11, 1933 2 Sheets-Sheet 2
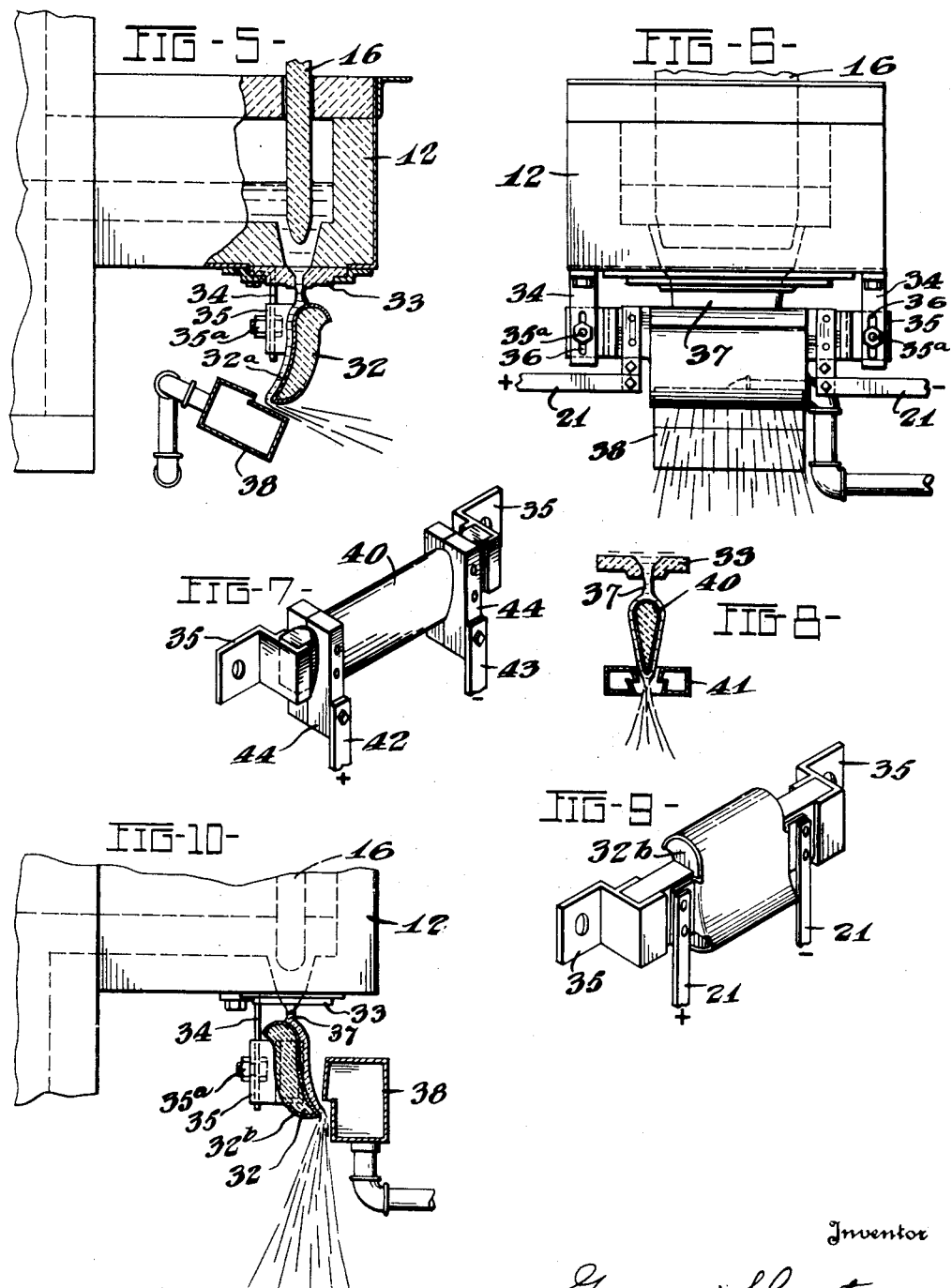

Patented Oct. 11, 1938

2,133,235

UNITED STATES PATENT OFFICE 2,133,235

METHOD AND APPARATUS FOR MAKING GLASS WOOL

Games Slayter, Newark, Ohio, assignor to Owens-Illinois Glass Company, a corporation of Ohio Application November 11, 1933, Serial No. 697,618
Renewed January 9, 1937

19 Claims. (Cl. 83—91)

My invention relates to method and apparatus for making glass wool and similar substances. In the manufacture of glass wool or the like, it is customary to flow the molten glass in a small stream or streams from a supply body of the molten material and apply thereto a blast of steam or other gas by which the material is drawn out into threads or filaments which are accumulated in the form of wool. The stream of glass ordinarily flows from the supply body through a bushing into the air, the blast of steam being applied at a point beyond the bushing. In the manufacture of very fine wool, an extremely high temperature of the glass at the time the blast of steam is applied thereto is required. With the usual methods above referred to, there is a great loss of heat through the bushing and in the air before the glass reaches the blower so that the glass when blown is at a considerably lower temperature than that in the supply body, the temperature being lower than that which is required for making very fine wool.

An object of the present invention is to provide suitable means for supplying glass to the blower at the desired high temperature. To this end, the invention provides means associated with the bushing for raising the temperature of the glass as it issues from the feeder boot or container.

A further object of the invention is to provide in association with the bushing through which the glass issues, an electrically heated element by which the temperature of the glass may be raised.

A further feature of the invention relates to means associated with the heating element for preventing destructive action of the molten glass flowing thereover.

Other objects of the invention will appear hereinafter.

In the accompanying drawings:

Fig. 1 is a sectional elevation of one form of apparatus for making glass wool.

Fig. 2 is a section at the line II—II on Fig. 1.

Fig. 3 is a plan view of the bushing through which the glass issues and the heating element.

Fig. 4 is a sectional elevation of the same.

Fig. 5 is a part sectional side elevation showing a modified form of heating apparatus.

Fig. 6 is a front elevation of the apparatus shown in Fig. 5.

Fig. 7 is a perspective view showing a further modification of the heating element.

Fig. 8 is a sectional elevation of the heating element shown in Fig. 7 and the blower.

Fig. 9 is a perspective view of the heating element and attachments shown in Figs. 5 and 6.

Fig. 10 is a part sectional elevation showing a modified arrangement of the heating element and blower.

Referring particularly to Figs. 1 to 4, inclusive, refined molten glass 10 is continuously supplied from the melting and refining tank 11 to a feeder boot or forehearth 12 which is an extension of the main furnace. The floor of the boot 12 has formed therein a well 13 extending therethrough. Beneath said well is a bushing 14 of refractory material, said bushing being removably secured in position by a ring 15. A refractory plug 16 extends downward into the glass over the bushing and may be adjusted up and down to control the flow of glass.

Associated with the bushing 14 or forming a part thereof is an electrical resistor or heating element 18. This heating element comprises a body portion 19 which fits within a circular opening in the bushing 14, said heating element having arms 20 extending from opposite sides thereof. Electric cables 21 are connected through terminals 22 to the arms 20. The heating element may be made of any suitable material having sufficiently high electrical conductivity and other required properties to permit such element to be raised to a high temperature when an electric current is passed therethrough. A material which has been found by experiment to be satisfactory for this purpose is silicon carbide, which is a product now on the market bearing the trade name "Globars".

The heating element 18 is formed with a central opening 23 through which the molten glass flows in a small stream. In order to protect the heating element from the fluxing action of the glass, a layer 24 of platinum or other heat resistant metal or material is spun on or otherwise applied to the inner surface of the bushing, so that the molten glass cannot contact with the heating material forming said element.

In operation, a continuous stream 25 of molten glass is permitted to flow through the opening 23, the size of the stream, if desired, being regulated by adjustment of the plug 16. The stream flows through a blower 26, which may be a conventional steam blower supplied with steam through a pipe 27. The blast of steam draws the molten glass out into fine filaments 28 which accumulate on a conveyor 29 and are carried thereby beneath a roll 30 by which the wool is compressed to form a loose mat. An electric current is caused to flow through the heating element 18 and surface layer 24, thereby maintaining it at a high temperature and causing it to raise the temperature of the stream of glass as the latter flows therethrough. In this manner, the glass may be brought to a very high temperature so that it may be drawn out or blown into very fine wool. Moreover, this high temperature of the glass may be maintained at the blower without requiring excessively high temperatures of the glass within the feeder boot. Fluxing and destructive action of the glass on the walls of the feeder is thus avoided or reduced to a minimum.

Figs. 5 and 6 illustrate a modification in which the heating element 32 is separate from the bushing 33. The heating element in this instance is located directly beneath the outlet and is spaced a short distance below the bushing. Said element, as shown, is downwardly and rearwardly inclined, the rear face thereof over which the glass flows being a compound curve, although the shape may be varied. It is carried on brackets 34. Lugs 35 secured to end extensions of the heating element, are clamped to the brackets 34 by bolts 35a extending through vertical slots 36 in the brackets, thereby permitting up and down adjustment of the heating element. The opening in the bushing 33 through which the glass issues is in the form of a slot extending lengthwise of the heating element 32 so that the glass issues in the form of a sheet 37. The blower 38 is elongated to correspond with the shape of the heating element and the sheet of glass flowing thereover. If desired, the bushing may be formed to provide a multiplicity of small streams. A construction adapted for this purpose is disclosed in my copending application Serial Number 685,251, filed August 15, 1933.

The blower 38 is positioned directly beneath the heating element and is arranged to direct a blast of steam or other gas across the path of the sheet or stream of glass directly below and in close proximity to the lower end of the heating element. The electric current passing through said element and through the surface coating 32a of platinum or other protective material, maintains the heating element at a high temperature which maintains or raises the temperature of the glass flowing thereover so that the glass is at a high temperature and in a highly fluent condition as it leaves the heating element. The blast of gas forcefully applied to the fluent glass draws it out into very fine filaments which are accumulated in the form of fine wool.

Figs. 7 and 8 illustrate a modified form of the heating element. This modified element 40, as shown in Fig. 8, is symmetrical with respect to the vertical plane of its longitudinal axis, and is so positioned that the stream or sheet 37 of glass flowing from the feeder outlet is divided and flows in sheet formation over both side surfaces of the heating element. The sheet flow of glass on opposite sides of the heating element is united at the lower edge of said element. The general construction of the blower 41 is similar to that of the blower 38 shown in Fig. 5, except that it comprises chambers on both sides of the flowing glass and supplies blasts of gas on both sides of the flowing glass. The construction of this blower may be the same or similar to that disclosed and claimed in my copending application Serial Number 685,251 above referred to. As shown in Fig. 7, the electrical terminals 42, 43 are attached to metal clamps 44 which surround the heating element, near the opposite ends thereof, making electrical contact with the heating element and/or the platinum surface material thereon.

The heating element 32b shown in Figs. 9 and 10 is substantially the same in form as that shown in Fig. 5, except that it is reversed so that the glass flows over the front surface thereof. The blower 38 is in this instance arranged to direct the blast of gas in a downward direction against the glass as it leaves the heating element. The position of the blower may be adjusted as may be desired to vary the angle at which the blast of gas strikes the flowing glass and also to vary the distance of said blast from the end of the heating element.

It has been found in practice that the best results are obtained when the blower is arranged to direct the blast of gas against the glass at a point or line just beyond that at which the glass leaves the heating surface so that the stream of gas will clear said surface and not contact the flowing glass until the latter has passed beyond said surface. The edge off which the glass flows is preferably sharp and even, and the gas issuing from the blower is preferably maintained at a high pressure such that the stream of gas is sharply defined as it is directed across the path of the glass flowing from said edge.

Modifications may be resorted to within the spirit and scope of my invention.

What I claim is:

1. The method of reducing a material to a fibrous condition which comprises flowing a stream from a molten supply body of the material, over a heated surface and thereby raising the temperature of the material above that of the molten supply body, causing the material to depart from said surface in a fluent condition, and applying to said fluent material a blast of gas by which the material is drawn out into fibers.

2. The method of reducing a material to a fibrous condition which comprises flowing a stream from a molten supply body of the material, over a heated surface and thereby raising the temperature of the material above that of the molten supply body, causing the material to depart from said surface in a fluent condition, applying to said fluent material a blast of gas by which the material is drawn out into fibers, cooling and solidifying said fibers as they are formed, and accumulating them in the form of wool.

3. The method of reducing a material to a fibrous condition which comprises flowing a stream from a molten supply body of the material, over a heated surface and thereby raising the temperature of the material above that of the molten supply body, causing the material to depart from said surface in a fluent condition, and applying to the fluent material a blast of gas beyond and closely adjacent to the point of its departure from said surface and thereby drawing the material into fibers.

4. The method which comprises passing a vitreous material over a heated surface while in contact therewith and thereby raising the temperature of said material, causing said material to depart from said surface in a fluent condition, applying a blast of gas to the fluent material at a point beyond but closely adjacent to said point of departure and in a direction transverse to said surface and toward the plane of said surface, and thereby drawing the material into threads or filaments, and cooling and solidifying the filaments as they are formed.

5. The method which comprises flowing molten glass or like material over a surface which is maintained at a higher temperature than that of the material flowing thereover and thereby raising the temperature of the material, and applying a blast of gas to said material closely adjacent its point of departure from said surface in a direction toward and substantially perpendicular to said surface and thereby drawing the material into fine threads or filaments.

6. The combination of a heating element, means for directing a flow of molten material over a surface of said heating element, means for maintaining said element at a higher temperature than that of the molten material flowing thereover and thereby raising the temperature of said material during its passage over said surface, and causing said material to flow from said surface in a fluent condition, and a blower arranged to direct a blast of gas against the material at a point beyond and closely adjacent to the heating element.

7. The combination of an electrical resistor forming a heating element having a heating surface over which molten glass flows as it issues from a container, means for passing an electric current through the heating element and thereby maintaining it at a higher temperature than the glass flowing thereover, said heating element consisting of a refractory material and a surface layer of protecting material of high heat conductivity covering the surface of the heating element over which the glass flows and protecting said element from the fluxing action of the glass, and means acting on the glass as it leaves the heating element to divide and draw it into fine filaments.

8. The combination of a heating element having a heating surface in the path of flowing glass, means for maintaining said heating element at a higher temperature than that of the glass flowing thereover and thereby raising the temperature of the glass as it flows over said heating element, and a blower adjacent said heating element and arranged to direct a blast of gas against the glass flowing from said heating surface in a direction transverse to said surface.

9. The combination of a heating element having a heating surface in the path of flowing glass, means for maintaining said heating element at a higher temperature than that of the glass flowing thereover and thereby raising the temperature of the glass as it flows over said heating element, a layer of protecting material of high heat conductivity overlying said surface and positioned to prevent contact of the flowing glass with the heating element, thereby protecting the heating element from the fluxing action of the glass, and means acting on the glass as it leaves said heating surface to segregate and draw it into a multiplicity of individual fibers.

10. The combination of a container for molten glass, said container having a narrow elongated bottom outlet through which the glass issues in sheet formation, a heating element positioned below said outlet and having a heating surface in the path of the glass and over which the glass flows in sheet formation, means for maintaining said heating element at a higher temperature than that of the glass in the container, and means acting on the glass as it leaves said heating surface to segregate and draw it into a multiplicity of individual fibers.

11. The combination of a container for molten glass, said container having a narrow elongated bottom outlet through which the glass issues in sheet formation, a heating element positioned below said outlet and having a heating surface in the path of the glass and over which the glass flows in sheet formation, means for maintaining said heating element at a temperature sufficiently high to raise the temperature of the glass flowing thereover, whereby the glass flows from said heating surface in a highly fluent condition, and a blower arranged to direct a blast of gas against the glass at a point beyond and closely adjacent to its point of departure from the heating surface and in a direction transverse to said surface.

12. The method which comprises causing a continuous flow of molten glass from a supply body, causing a sheet formation of the flowing glass, raising the temperature of the glass while in said sheet form, to a higher temperature than that of the supply body, and applying to a localized portion of the sheet, a blast of gas by which the glass is drawn into fibres.

13. The method which comprises causing a continuous flow of molten glass from a supply body, causing a sheet formation of the flowing glass, raising the temperature of the glass while in said sheet form, to a higher temperature than that of the supply body, and applying to said sheet, in a direction transverse thereof, a sheet of gas under pressure and thereby drawing the glass into fibres.

14. The method which comprises causing a continuous flow of molten glass from a supply body, causing a sheet formation of the flowing glass, raising the temperature of the glass while in said sheet form, to a higher temperature than that of the supply body, providing a support for the sheet of glass at one side thereof, and applying a blast of gas to said sheet at the side thereof opposite the support and immediately beyond the edge of said support and in a direction transverse to the plane of said sheet and thereby drawing the glass into individual fibres.

15. The method of reducing a material to a fibrous condition which comprises flowing a stream from a molten supply body of the material, over a directing surface, supplying a regulated amount of heat to said surface independently of that supplied by the molten material and thereby regulating the temperature of the material flowing over said surface and causing the material to depart from said surface in a highly fluent condition, and applying to said fluent material a blast of gas by which the material is drawn out into fibers.

16. The combination of a heating element, means for directing a flow of molten material over a surface of said heating element, means for supplying heat to said element independently of the heat supplied from said material and in sufficient amount to maintain said surface at a high temperature and thereby cause the material to flow from said surface in a highly fluent condition, and a blower arranged to direct a blast of gas against said material at a point beyond and closely adjacent to the heating element.

17. The combination of an electrical resistor forming a heating element having a heating surface in the path of flowing glass, means for supplying electric current to the resistor and thereby maintaining it at a high temperature by which the glass flowing thereover is caused to depart from said surface in a highly fluent condition, and a blower arranged to direct a blast of gas against the fluent glass at a point beyond and closely adjacent to the heating element.

18. The combination of a heating element formed to provide a passageway, means for directing a flow of molten material through said passageway in contact with the walls thereof, means for supplying heat to said element independently of the heat supplied from said molten material and in sufficient amount to maintain said surface at a high temperature, and thereby facilitate the flow of the material over said surface and maintain the material at a high temperature, the walls of said passageway being upwardly and outwardly flared to provide a streamlined surface, and a blower arranged to direct a blast of gas against said material at a point beyond and closely adjacent to the outlet and thereby apply a drawing force to the material while molten and at a high temperature and draw the material to fine fibrous form.

19. Apparatus for producing glass wool comprising in combination, a heating element formed to provide a passageway for the flow of molten glass therethrough, said passageway having a constricted outlet to restrict the flow to a small stream, means for maintaining the walls of said opening at a high temperature, said walls being curved upwardly and outwardly from said outlet to provide a streamlined surface over which the glass is caused to flow, and blowing means arranged to envelop the stream in a blast of gas closely adjacent the outlet and attenuate the stream to fine fibrous form.

GAMES SLAYTER.